United States Patent [19]

Bricker et al.

[11] 4,043,780
[45] Aug. 23, 1977

[54] GLASS SHEET TEMPERATURE MONITORING SYSTEM

[75] Inventors: Jack A. Bricker; John P. Durci, both of Tarentum, Pa.

[73] Assignee: PPG Industries, Inc., Pittsburgh, Pa.

[21] Appl. No.: 692,156

[22] Filed: June 2, 1976

[51] Int. Cl.² ............................................. C03B 29/04
[52] U.S. Cl. ......................................... 65/29; 65/158; 65/162
[58] Field of Search ............................ 65/29, 158, 162

[56] References Cited

U.S. PATENT DOCUMENTS

| | | | |
|---|---|---|---|
| 1,974,058 | 9/1934 | Wadman | 65/162 X |
| 3,293,015 | 12/1966 | Fredley et al. | 65/182 A |
| 3,479,172 | 11/1969 | McCown et al. | 65/158 |
| 3,508,899 | 4/1970 | Ward | 65/162 X |
| 3,849,099 | 11/1974 | Matby, Jr. et al. | 65/29 X |

Primary Examiner—Arthur D. Kellogg
Attorney, Agent, or Firm—Dennis G. Millman; Edward I. Mates

[57] ABSTRACT

Monitoring the temperature profile of a series of glass sheets heated while conveyed through a furnace where they are heated preparatory to their rapid cooling required for tempering. Representative temperatures are taken at selected portions of the upper and lower surfaces of selected sheets to determine the temperature difference between the top and bottom surfaces and an indication of the temperature profile transverse to the direction of glass sheet movement. The temperature monitoring system may also include an additional temperature measuring station at a suitable position in a quenching zone where the heated glass sheets are rapidly cooled.

12 Claims, 6 Drawing Figures

GLASS SHEET TEMPERATURE MONITORING SYSTEM

BACKGROUND OF THE INVENTION

1. Field of the Invention

Glass sheets are tempered by a process involving heating glass sheets above the strain point and approaching the softening point of the glass and then substantially cooling the heated glass sheets. Typical apparatus for tempering glass sheets comprises a tunnel-type heating furnace followed by a cooling station disposed in end to end relation with said furnace.

When glass sheets are tempered or heat strengthened, it is necessary to heat the glass sheets to a temperature above that at which the contour is changed by a deformation stress on contact with solid members. Where it is desired to strengthen glass sheets, it is further necessary to rapidly cool the glass sheets from such a deformation temperature to a lower temperature below the annealing range of the glass. The effectiveness of such strengthening is improved by an improvement in the control of the temperature to which the glass sheets are heated before they are rapidly chilled. This includes controlling the relative temperature of the top and bottom glass surfaces and the temperature profile across the dimension of the sheet transverse to its path of movement through the heating furnace and cooling station.

Glass is known to be strong in compression and weak in tension. Tempering glass increases the compression stress at the surface, thus increasing the resistance of tempered glass to fracture on impact compared to untempered glass. Furthermore, in the less frequent times that tempered glass fractures on impact, it forms smaller fragments that are less harmful than the relatively large fragments with jagged edges that result when untempered glass is broken.

There are three well-known systems for handling glass sheets during tempering. In one of these systems, glass sheets are suspended by one or more sets of tongs in a vertical disposition during their conveyance through a heating furnace and a cooling station. The tongs tend to penetrate the heat-softened glass and impart poor optical properties in the vicinity of the tong support areas.

Glass sheets are also handled by conveyance on spaced, rotating rollers disposed with their peripheral surfaces forming a horizontal path for transporting glass sheets through an elongated heating furnace and a cooling station. The need to space the rollers from one another to permit radiant energy to impinge on the lower glass surface causes the glass to sag and develop an optical defect. This defect has resulted in a desire to develop a technique for handling glass sheets in which their engagement by solid members which tend to distort the glass with its heat-softened properties is at a minimum. Such a technique is the so-called gas hearth method in which glass sheets, at least during the portion of the heating and cooling cycle when they are sufficiently hot to distort readily when their major surface contacts a solid member, are supported on a gaseous bed and engaged along a side edge only so as to minimize the portion of the glass sheet surface that engages a solid member during the critical portion of its thermal treatment when the glass is most liable to distortion.

When glass sheets are tempered on the gas hearth, if their upper and lower surfaces are heated to different temperatures, the glass tends to warp. If the glass warps into a configuration that is concave in elevation in a direction transverse to the path of glass movement, the lower central portion of the glass comes into engagement with the upper surface of the apertured bed which supplies hot gas for supporting the glass sheet during its thermal treatment, thereby developing surface scratches that develop into optical defects. If the concave warp is sufficiently severe, the glass will bring-up on the hearth bed and stop the flow of glass sheets through the furnace.

In a typical gas hearth operation, the glass is supported in a transversely oblique plane oriented approximately 5° from the horizontal in a direction transverse to the direction of glass sheet movement and rotating discs are provided to engage the lower edge of the glass to propel the glass sheets by friction in a forward direction through the critical portion of the conveyor. The temperature profile of the glass sheets transverse to their path of movement along the gas hearth is very important. The temperature must be substantially uniform, although the edge portion engaged by the rotating discs that propel the glass sheets forward through the gas hearth heating furnace may be at a slightly lower temperature such that the engaged edge is not unduly distorted by contact with the rotating driving discs. The top surface temperature must at least equal the bottom surface temperature to avoid concave configuration in the glass.

In treating glass sheets to develop a temper therein, it is desirable to provide temperature monitoring means that provides a comparison of the upper and lower glass sheet surfaces and also a temperature profile of the glass transverse to the path of movement while the glass sheets are being heated.

2. Description of the Prior Art

A typical gas hearth operation for which the present invention is especially adapted is disclosed in U.S. Pat. No. 3,223,501 to Fredley and Sleighter. However, it is understood that the present invention is also adapted for use with a roller hearth type of operation such as disclosed in U.S. Pat. No. 3,245,772 to Cypher and Davidson. In the past, the temperature of conveyed glass sheets has been monitored as they pass one or more fixed points along the conveyor where the glass temperature is continuously or intermittently measured.

U.S. Pat. No. 3,479,172 to McCown, Maltby and Allen discloses a glass sheet temperature assembly which includes a radiation sensing device mounted for movement in a reciprocal path between sidewalls of a lehr in position to detect the temperature of the lower surface of a ribbon.

U.S. Pat. No. 3,634,057 to Tate, Summers and Kramer discloses an elongated tube having an end opened to a supporting gas film for subjection to a change of pressure whenever a glass sheet passes over the open end.

U.S. Pat. No. 3,744,945 to Peternel discloses a temperature sensing mechanism for measuring the temperature of different portions of successive glass sheets according to a repetitive cycle as glass sheets supported by tongs leave a furnace en route to an additional treatment station.

U.S. Pat. No. 3,819,347 to Callies, Irlind, Retzloff and Zellers discloses a scanning pyrometer used to control the temperature and thickness of a glass sheet.

U.S. Pat. No. 3,849,099 to Maltby and O'Connell discloses a system for measuring a temperature profile across a glass ribbon comprising a pyrometer mounted on a carriage for reciprocating movement transverse to the path of glass ribbon movement in a plane above the plane of support for the glass.

SUMMARY OF THE INVENTION

The present invention comprises method and apparatus for measuring the temperature of the bottom surface of each glass sheet conveyed along a heating furnace and for monitoring the temperature of different selected portions of the upper surface of successive glass sheets according to a predetermined cycle of temperature measurements.

A specific embodiment of the present invention developed for use in combination with a gas hearth furnace and quench of the type depicted in U.S. Pat. No. 3,223,501 to Fredley and Sleighter comprises a glass surface temperature measuring and profiling system designed to assist furnace operating personnel in maintaining desired glass temperatures at the furnace and quench exits. In addition, the temperature profile information can be used to minimize temperature gradients across the width of glass sheets processed. To accomplish this, the system comprises three radiation pyrometers and hardware for supporting and indexing a pyrometer to select points over the hearth width.

Measurement is accomplished at three locations in the process. A top surface temperature value is obtained at one of several preselected points along a line extending transverse of the conveyor in the hearth area near the furnace exit. This location provides the data for developing a lateral plate temperature profile. A second value is obtained from the bottom plate surface in the hearth area also near the furnace exit and a third value is taken on the plate top surface after the sheet leaves the first zone in the cooling station.

A lateral plate temperature profile is developed using a top surface measurement circuit and temperature values taken by a top surface pyrometer. The pyrometer is carried by a housing mounted on a scanning bridge which spans the furnace width. The housing can be automatically driven and indexed to preselected positions. The furnace width is divided into several sections and the furnace operator may select the number of sections that contain a pyrometer position to cover the width of the glass sheets being processed from a bridge scan motor. If the product change is made to some new width, the operator may change the position selector to the correct coverage and the system will automatically adjust and scan only those positions required to cover the width of the different pattern of glass sheets processed. One temperature measurement is taken on each glass sheet processed. Thus, if five positions are required to cover the product, a profile would be completed after five sheets have been processed. Upon taking a measurement at the last selected position, the pyrometer returns to the number one position and starts again, continuously cycling. The value representing each selected position is displayed in analog form for the operator on a multipoint recorder.

Access to the glass surface is through the furnace roof. Sight tubes are located at each of the selected positions and extend through to the inner surface of the roof refractory. They are aligned to provide an optical path for the pyrometer at each of the indexed positions on the bridge. At the top end of each sight tube is a "flapper" type valve or cover which is operated by a solenoid valve. These covers provide means for retaining furnace heat when the pyrometer is not in position aligned over the corresponding sight tube. Only the valve for a single pyrometer position is open at any given time. Control for the solenoids is provided by switches also mounted on the scanning bridge.

A bottom plate surface value is taken at a fixed position near the furnace exit. Access to the bottom glass surface is provided by a sight tube which extends upward from the furnace bottom into the hearth refractory. A bottom surface pyrometer is mounted with its sighting axis disposed through the sight tube to view the bottom glass surface.

To determine the amount of cooling that has taken place during quenching, a pyrometer is mounted at the end of the first quench zone. It is supported by a mounting frame attached to the quench support structure. The pyrometer views the top glass surface at the exit of the first quench zone. The unit views directly the glass surface and has no associated sight tube.

The installation of the temperature measuring system improves the process performance of glass tempering apparatus and is an acceptable part of the furnace operating hardware. Operational changes in roof burner heating profiles are made when temperature readings indicate the need thereof, which changes improve the resulting product.

The most significant contribution, however, has been in the area of wide glass sheets (more than one meter wide). Major difficulty had been experienced in processing wide glass. The temperature profiling system detects critical lateral plate temperature variation, which, when corrected, results in successful runs of high yield and quality.

BRIEF DESCRITION OF THE DRAWINGS

In the drawings which form part of a description of an illustrative embodiment and modification of the present invention, and wherein like reference nunbers refer to like structural elements, FIG. 1a is a side elevational view of the preheat zone of the apparatus for tempering glass sheets with portions of the apparatus removed;

DESCRIPTION OF ILLUSTRATIVE EMBODIMENTS

Figure 1A:
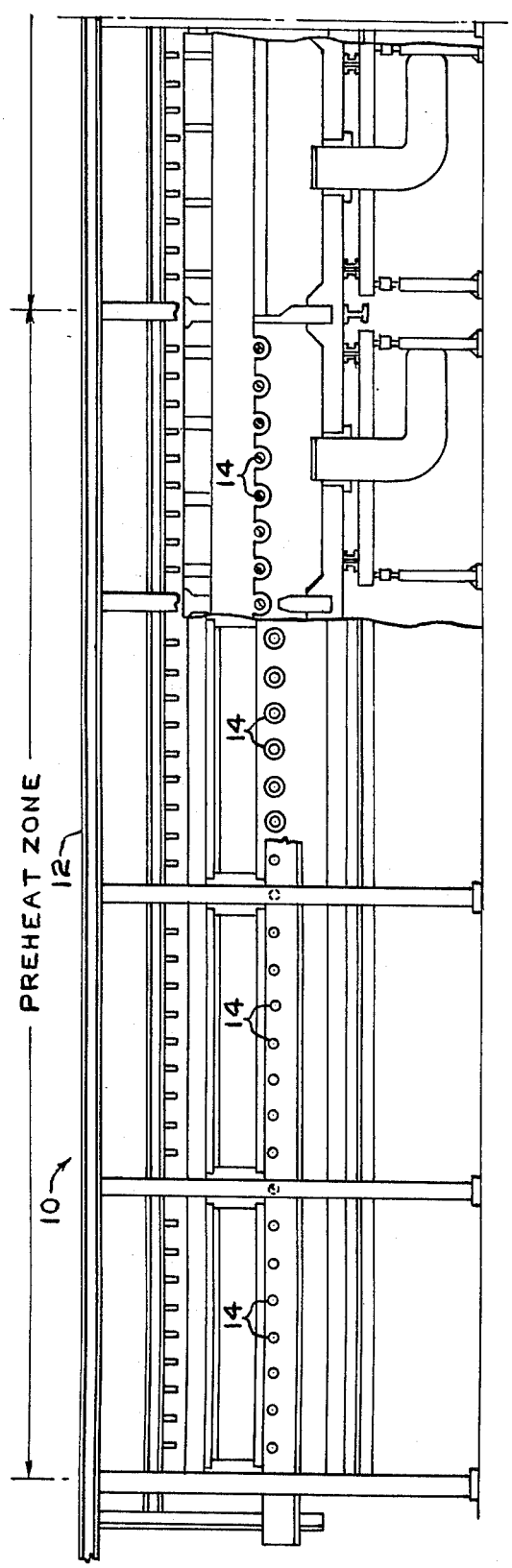
FIG. 1b is a side elevational view of the gaseous and quench zones of the apparatus for tempering glass sheets with portions of the apparatus in both the gaseous and quench zones removed.

Referring to the drawings, a tunnel-type heating furnace 10 is provided for transporting glass sheets lengthwise thereof. The glass sheets are conveyed through a preheat zone 12 on longitudinally spaced, transversely extending conveyor rolls 14 shown at different elevations in different portions of the furnace 10. The conveyor continues through a gaseous zone 16 which includes a gas hearth 18 (see FIGS. 2, 3 and 4) having an obliquely-disposed, apertured, upper bed through which hot gaseous products are provided to support glass sheets on a film of gas at an oblique angle parallel to the upper surface of the gas hearth 18 with driving discs 20 disposed to engage the lower longitudinal side edge of glass sheets G for conveyance beyond the preheat zone 12. Additional driving discs 20 are provided in a first quench zone 22, which is followed by additional quench zones 24. Since the glass sheet surfaces are sufficiently cool when they arrive at this position to have little likelihood for damage, conveyor rolls 14 are longitudinally spaced to provide spaced rotating supports in zones 24.

In the furnace, a series of heating elements 26, each of which has its output individually controlled, provides a pattern of heat radiated downward on the upper surface of the glass sheets G transported through the furnace 10. A mixture of air and gas is provided for the gas hearth 18 to heat the lower surface of the glass sheets as the latter are conveyed through the furnace 10.

The furnace is of the type of gas hearth furnace similar to that disclosed in U.S. Pat. No. 3,223,501 to James C. Fredley and George E. Sleighter, except for the fact that gas burners are provided as radiant heat sources rather than electrical heaters. However, the details of the furnace insofar as it relates to the gas hearth structure thereof is only by way of providing background for the present invention, as the present invention may be used in conjunction with other heating furnaces besides the gas hearth furnace disclosed in the drawings of the present application. For example, so-called roller hearth furnaces in which the glass is conveyed throughout the entire furnace length on rollers instead of being supported in the hottest portion thereof on a gaseous hearth 18 may also be modified in accordance with the present invention.

The glass sheets that are handled according to the present invention are first heated while conveyed through the furnace 10 and then chilled rapidly in the first quench zone 22 to impart at least a partial temper thereto. In order to cool the glass, each of the quench zones 22 and 24 has an upper plenum chamber 28 pivotally supported by pivotal support means 29 and a lower plenum chamber 30. Flexible tempering fluid supply conduits 32 supply tempering fluid (usually air) under pressure into the upper and lower plenum chambers 28 and 30 through the flexible conduits 32 from pressure sources (not shown). Only the tempering fluid system for the upper plenum chambers 28 is partially disclosed. It is appreciated that similar construction is available to supply tempering fluid to the lower plenum chambers 30.

The present invention is provided with a top surface pyrometer 34 disposed above the gaseous zone 16 of the furnace 10 and a bottom surface pyrometer 36 disposed below the gas hearth 18. An additional pyrometer 38 is located at the end of the first quench zone 22 and directed downward to focus on the upper surface of glass sheets as the latter leave the first quench zone 22.

The top surface pyrometer 34 is carried by a housing 40. The housing is connected to a chain drive 42. The latter chain interconnects a pair of sprockets 44, each of which are mounted on a scanning bridge 46. The scanning bridge is supported in such a manner that the top surface pyrometer 34 is sighted in a vertically downward position to be focused in the top surface of a glass sheet G passing thereunder. The housing 40 contains a switch actuating cam 48 in its upper surface thereof. The cam 48 is movable between positions to engage one of five unidirectional actuated switches 51, 52, 53, 54 and 55, which are mounted on a superstructure 56 for the scanning bridge 46. Additional safety override switches 58 and 60 are also mounted on the superstructure 56 to either side of the unidirectional actuated switches 51 to 55. A motore 62 and a chain drive system 64 is mounted on the scanning bridge 46 to actuate the chain drive 42 to move the housing 40 to various positions as determined by a cycle of operation, wherein the switch actuating cam 48 engages the different unidirectional actuated switches 51, 52, 53, 54 and 55 or any preselected combination of said unidirectional actuated switches according to a desired cycle of operation. A sight tube support structure 70 supports a series of sight tubes 71, 72, 73, 74 and 75, each extending through vertical apertures in the roof of the furnace in alignment with each of five positions that the top surface pyrometer 34 occupies when cam 48 engages one of the unidirectional actuated switches 51 to 55, respectively. Each of the sight tubes 71 to 75 is provided with a pivotable cover 76. The cover is kept closed to protect the upper surface of the bed from dirt and dust and other particles harmful to the bed surface, and is opened for a brief portion of the temperature monitoring cycle to reduce the incidence of dirt particles.

Each of the covers is operatively connected to an air cylinder 78, which is operated from a solenoid valve (not shown) to pivot the cover of one of the sight tubes into the open position when cam 48 engages one of the unidirectional actuated switches 51 to 55 so that the cover 76 of its corresponding sight tube 71 to 75 is opened before the top surface pyrometer 34 is sighted through said one of the sight tubes 71 to 75 that has its top cover 76 pivoted into the open position.

Since the sight tubes extend through a furnace wall of refractory material, their upper portions are insulated from the heat of the furnace. Hence, furnace gases tend to be entrapped when the covers 76 are closed. This insulation results in some cooling of the entrapped gases, which may increase the water content and provide an error in temperature measurement. The present invention minimizes this error by opening each sight tube in turn sufficiently prior to the temperature measurement therethrough to purge said sight tube of a substantial amount of this water content and relatively cool gas.

The bottom surface pyrometer 36 is sighted through a mirror and a sight tube 80 that extends obliquely upward through an aperture in the gas hearth 18 to enable the bottom surface pyrometer to be focused on the bottom surface of glass sheets as the latter pass through a given position within the gaseous zone 16 of the furnace 10. Thus, when the leading edge of a glass sheet passes over the position of the sight tube 80, the bottom surface pyrometer 36 actuates a timer circuit that initiates the operation of several steps in a phase of the temperature sensing cycle.

Figure 5:
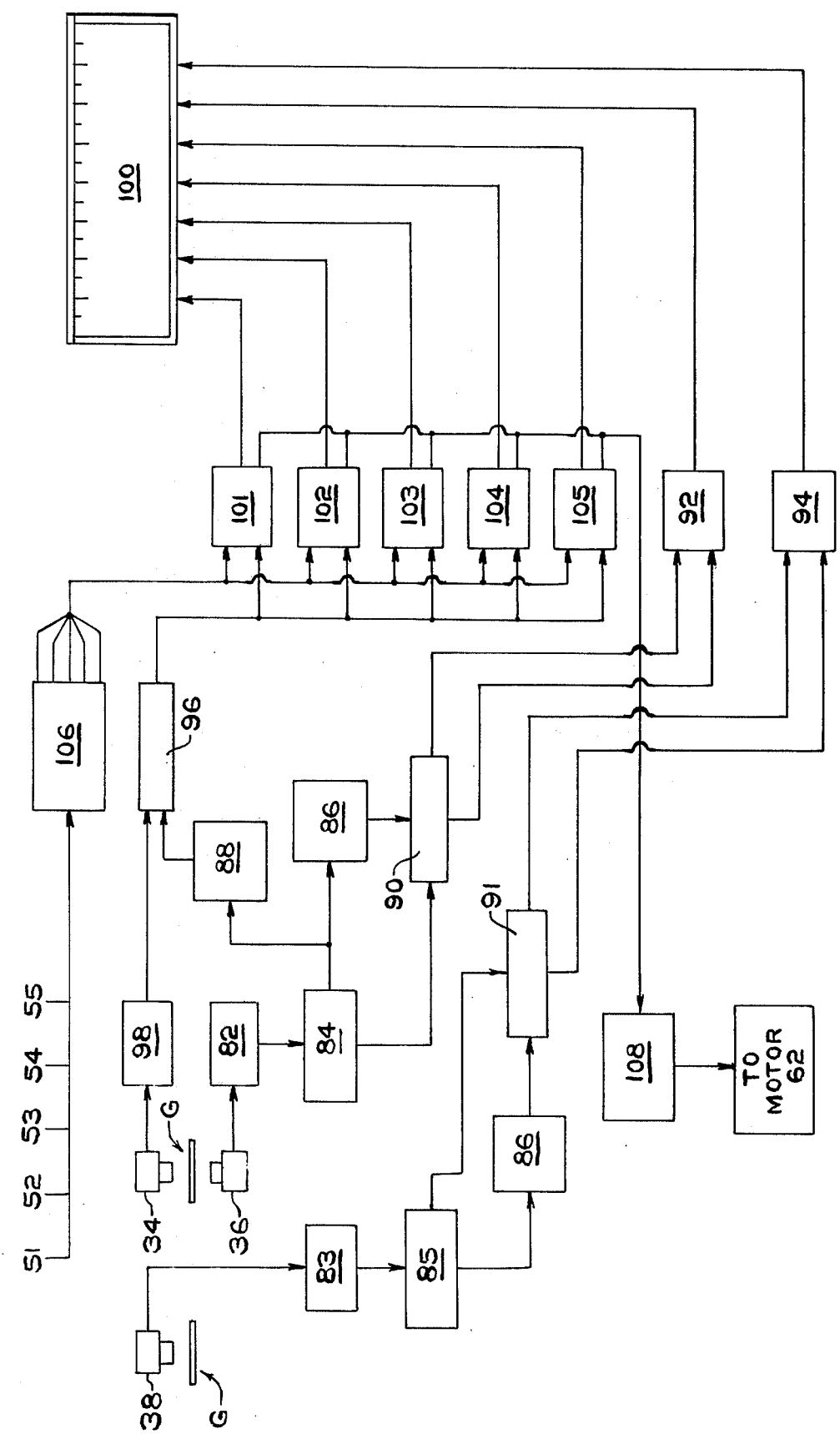
FIG. 5 is a block diagram of circuit elements of the temperature measuring system according to the present invention.

Referring to FIG. 5, the temperature sensing phase for each sensing cycle is initiated when the leading edge of a glass sheet passes over the oblique sight tube 80. The bottom surface pyrometer 36 is operating continuously and comprises an amplifier circuit 82, which is usually an Ircon amplifier that forms part of the pyrometer, the voltage output of which amplifier circuit is related to the temperature sensed by the bottom surface pyrometer 36. When the leading edge of a glass sheet moves into the optical path of the bottom surface pyrometer 36, the voltage output of the amplifier increases and is fed into a plate detection circuit 84. The latter is a voltage comparator that has a reference input voltage, which, when the amplifier circuit output voltage exceeds it, actuates a first adjustable time delay circuit 86 for the bottom surface temperature sensing system and a second adjustable time delay circuit 88 for the top surface temperature sensing system. Each of the time delay circuits is adjusted to provide a temperature measurement on the lower surface (by pyrometer 36) or a temperature measurement on the top surface (by pyrometer 34) at independent predetermined time intervals after the leading edge passes. Thus, the time delay adjusted for the top surface temperature measurements may be independently controlled from that adjusted for the bottom surface temperature measurements.

A first smoothing circuit 90 is coupled to the plate detection circuit 84 to store the output voltage signal from the latter when the adjustable time delay circuit 86 times out to produce a signal that actuates smoothing circuit 90 to receive the output voltage signal from the plate detection circuit and combine it with the two most recently received output voltage signals from said circuit 84 to produce a plate output that is received in a bottom plate value storage circuit 92. The adjustable time delay circuit 86 also controls the time that the output of the smoothing circuit 90 is transferred to and stored in the bottom plate value storage circuit 92.

A multipoint recorder 100 is coupled to the bottom plate value storage circuit 92 to provide a written record of the bottom surface temperature recorded in the bottom plate value storage circuit.

The additional pyrometer 38 is operated in a similar manner to bottom surface pyrometer 36 with a circuit comprising an amplifier circuit 83 (similar to circuit 82), a smoothing circuit 91 (similar to circuit 90) and a quench plate value storage circuit 94, which is also coupled to the multipoint recorder 100 to provide a written record of the sample temperature of a preselected portion of each glass sheet at a predetermined position as it leaves the first quench zone 22.

The top surface pyrometer 34 is coupled to a smoothing circuit 96 that is identical to smoothing circuit 90 through an amplifier circuit 98 that is identical to amplifier circuit 82. The output from plate detection circuit 84 is coupled to smoothing circuit 96 through adjustable time delay circuit 88 to provide an output voltage signal at a preselected time. The modified output signal from smoothing circuit 96 is guided into one of five top surface plate value storage circuits 101 to 105, as determined by which of the unidirectional actuated switches 51 to 55 happens to be actuated by cam 48. Each of the top surface plate value storage circuits 101 to 105 supplies a value to mulitpoint recorder 100. A storage position control circuit 106 comprising a series of AND-gates (one for each of the positions aligned with a corresponding sight tube 71 to 75 and where cam 48 actuates a corresponding unidirectional actuated switch 51 to 55) guarantees that the modified output signal of smoothing circuit 96 is delivered to the proper corresponding top surface plate value storage circuit 101 to 105.

Each top surface plate value storage circuit 101 to 105 is coupled to a scanner advance circuit 108. The latter drives motor 62 to move the housing 40 from a position where cam 48 engages one of the unidirectional actuated switches 51 to 55 to a postion where it engages another of said switches 52 to 55 according to a cycle of engagements. That is, the scanner advance circuit 108 controls the operation of motor 62 so that when the cam 48 disengages switch 51, the pivotable cover 76 for sight tube 71 closes, and motor 62 drives housing 40 to a position where cam 48 engages switch 52, causing pivotable cover 76 over sight tube 72 to open and allow the hot furnace gases to purge sight tube 72 before the temperature measurement circuit including top surface pyrometer 34 is actuated. Each of the top surface plate value storage circuits 101 to 104 is provided with a forward control circuit for the scanner advance circuit 108, so that housing 40 may move from switch 51 to switch 52 or from switch 52 to switch 53 or from switch 53 to switch 54 or from switch 54 to switch 55. In addition, top surface plate value storage circuits 102, 103, 104 and 105 are coupled to individual return control circuits to enable housing 40 to return to the position of switch 51 from the switch positions 52, 53, 54 and 55 when desired.

When narrower glass sheets are processed, the return control circuit for circuit 105 is disconnected and as many forward control circuits as are not needed are disconnected for circuits 104 and/or 103 and/or 102. Under such circumstances, the top surface pyrometer 34 will be programmed to a cycle of fewer temperature measurements and the corresponding top surface plate value storage circuits disconnected and omitted from the circuitry so that more frequent top surface measurements are made at each switch position used when processing narrower sheets.

The system just described causes the top surface pyrometer 34 to measure the temperature at one of the positions immediately beneath one of the sight tubes 71 to 75 after its pivotable cover 76 has opened and the corresponding sight tube has been purged. In addition, the bottom surface pyrometer 36 determines the temperature of the bottom glass sheet surface a predetermined time interval after sensing the passage of the leading edge of the glass sheet over the sight tube 80.

The motor 62 actuates the chain drive 42 to move the housing 40 containing the top surface pyrometer 34 from a position in which the switch actuating cam 48 engages one of the unidirectional actuated switches 51 to 55 to a position in which it indexes the next successive unidirectional actuated switch of the series of switches 51 to 55 according to a predetermined sequence.

The combination of the top surface pyrometer 34 with the sight tubes 71 to 75 and their pivoted covers 76 cooperate with the bottom surface pyrometer 36 to provide a profiling system wherein the top surface pyrometer 34 monitors discrete points judiciously spaced across the width of the gas hearth or of glass sheets G that are conveyed over the gas hearth, to provide a reliable temperature profile for glass sheets being processed in the gas hearth process, and bottom surface pyrometer 36 measures the temperature at a preselected point of each glass sheet that is processed on the gas hearth 18. Hence, the bottom surface pyrometer provides a temperature measurement for the bottom surface of the glass sheets whereas the top surface pyrometer 34 provides a profile of the temperature across the width of the top surface of the glass sheets.

The temperature profiling system disclosed is very effective when processing glass sheets having a width greater than one meter.

Figure 1B:
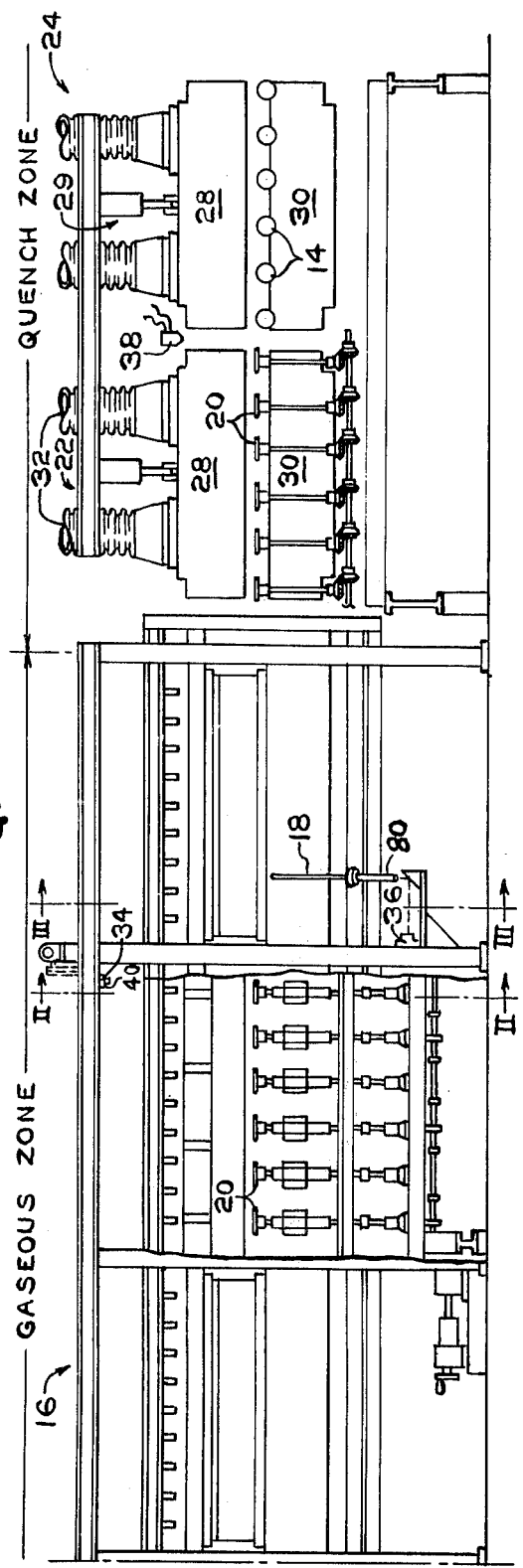
Figure 2:
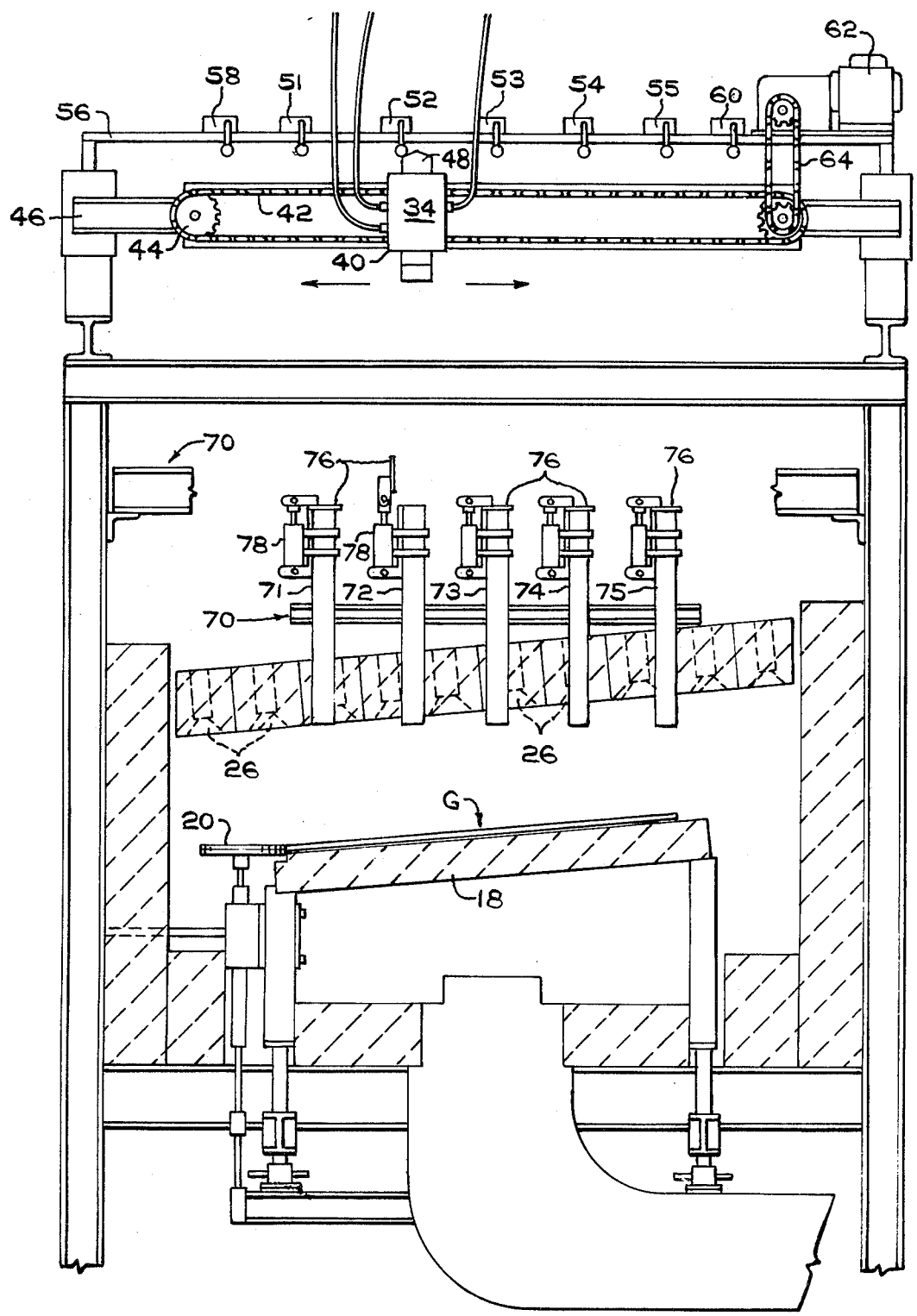
FIG. 2 is a fragmentary cross-sectional view taken along the lines II—II of FIG. 1.
Figure 3:
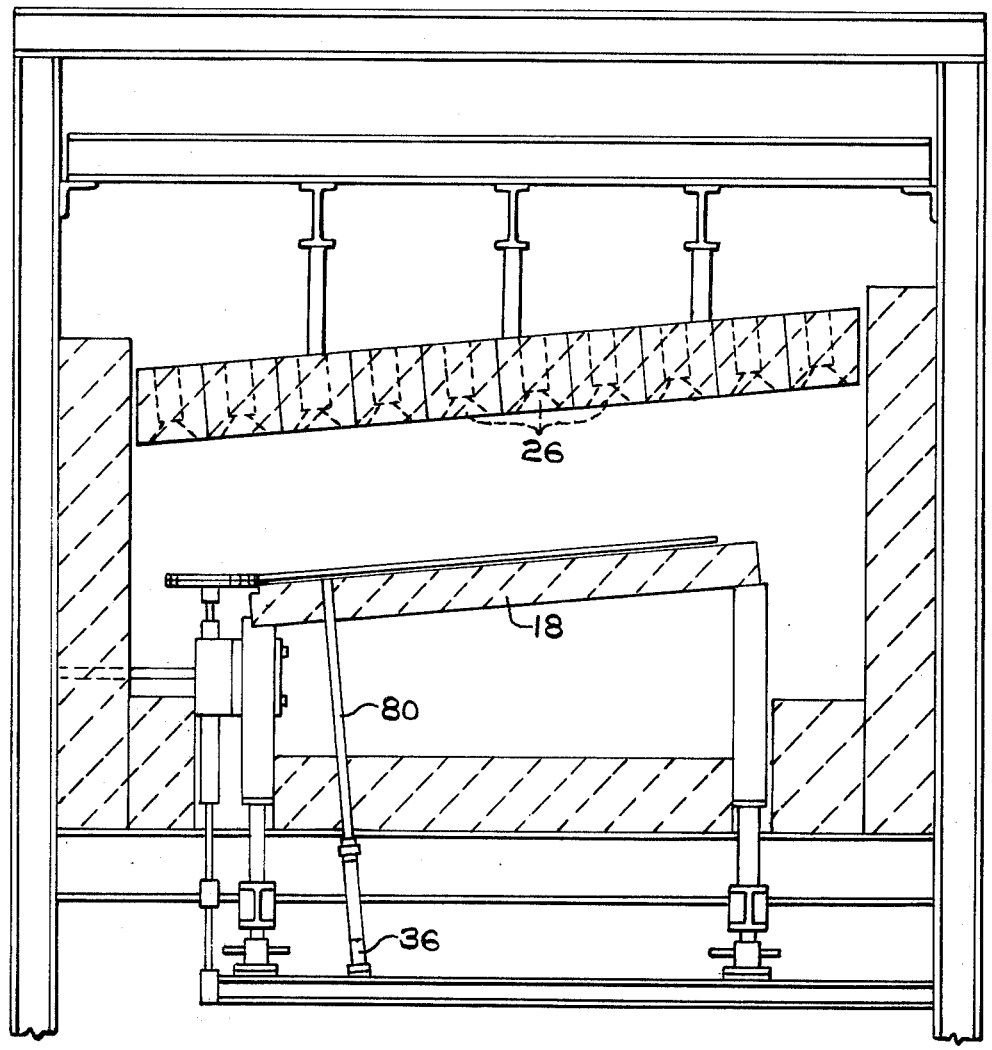
FIG. 3 is a fragmentary sectional view taken along the lines III—III of FIG. 1.
Figure 4:
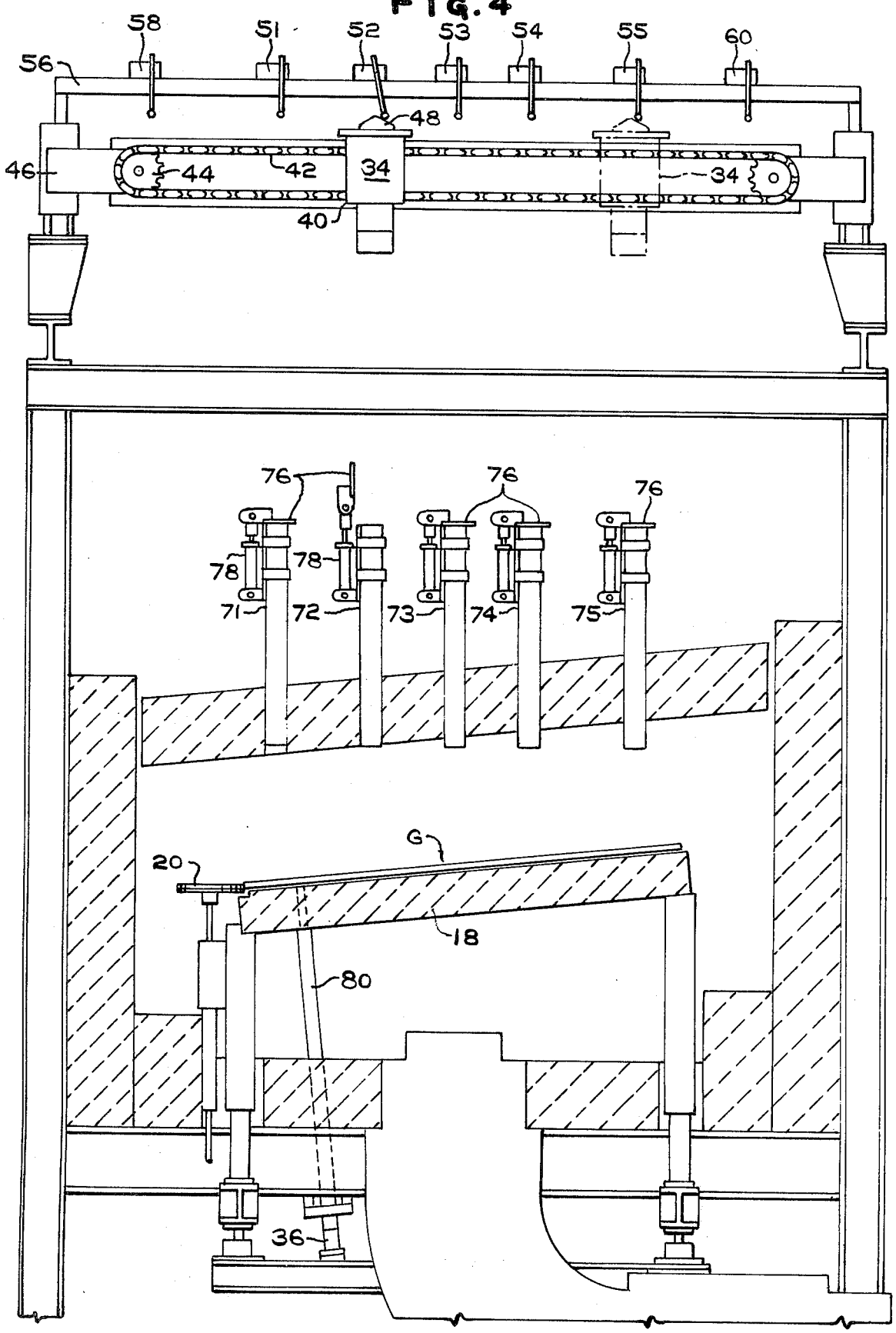
FIG. 4 is a fragmentary sectional view of an alternate embodiment of the present invention.

In the embodiment of FIGS. 1 to 3, the path transversed by the top surface pyrometer 34 is in a vertical plane that is offset from the vertical plane of the position of the bottom surface temperature that is monitored by the bottom surface pyrometer 36. This system would require a different time delay for the top surface temperature determination than that required by the bottom surface temperature determination after the leading edge of the glass sheet has been sensed. In the alternate embodiment of FIG. 4, the vertical plane occupied by the path of transverse movement of the top surface pyrometer 34 is identical to the vertical plane occupied by the bottom surface pryometer 36. The location on the bottom surface where the temperature is sensed by the bottom surface pyrometer 36 is laterally between two of the five selected positions for monitoring the top surface temperature.

When narrower glass sheets are being processed, it is possible to alter the cycle of temperature measurements made by the top surface pyrometer 34 so as to eliminate the temperature measurement through sight tube 75. For narrower sheets, temperature measurements through sight tube 74 are eliminated. For even narrower glass sheets, additional temperature measurements can be eliminated.

In the usual cycle for top temperature measurements, for one glass sheet of a series to be measured, top surface pyrometer 34 is aligned over sight tube 71 and its pivotable cover 76 is raised to enable top surface pyrometer 34 to measure the top surface temperature of the glass sheet at a predetermined time interval after the leading edge of said sheet has been monitored by bottom surface pyrometer 36. After the measurement is taken, cover 76 on sight tube 71 closes and the motor 62 moves the housing 40 to a position in which cam 48 engages limit switch 52 to raise the pivotable cover 76 over sight tube 72. The timer circuits 86 and 88 are ready to be actuated by the presence of a leading edge of a succeeding glass sheet over sight tube 80 so that its presence may be sensed by the bottom surface pyrometer 36. Top surface pyrometer 34 monitors the temperature of a predetermined portion of the top surface of the next succeeding glass sheet as the predetermined portion passes beneath sight tube 72. This process is repeated for sight tube 73, sight tube 74 and sight tube 75 or as many of the sight tubes as required to traverse the entire width of the successive glass sheets. After obtaining the temperature reading of the desired points along the top surface for each successive glass sheet in a series, the motor 62 causes the housing 40 to return in position where its cam 48 engages the first unidirectional actuated switch 51 wherein the cycle of top temperature measurements is repeated.

It is understood that the bottom surface temperature of each glass sheet is measured at the same point relative to the leading edge as every other glass sheet. The top surface measurements are measured at different, laterally spaced points along the same line as determined by the time delay by the passage of the leading edge of the glass over the sight tube 80 to the time at which the moving line of glass moves between the line of the corresponding open sight tubes 71 to 75 to permit the temperature to be measured at the top surface.

The additional pyrometer 38 located at the end of the first quench zone 22 is in position and is used to determine the temperature of glass sheets at the end of the first quench zone 22. The glass temperature is preferred to be at a maximum of approximately 850° F. (approximately 450° C.) to avoid having the interior heat of the glass reheat the glass so that the temper is reduced by reannealing. The additional pyrometer 38 is positioned at this location to insure that no change is needed in the cooling rate provided in the first quench zone 22.

In typical commercial operation, it has been found that adequate temper can be obtained by manually controlling the air to gas mixture and/or the rate of gas flow into the gas hearth 18 to alter the bottom surface temperature as needed, and to alter the heat output of the heating elements 26, which irradiate heat onto the upper glass sheet surface to modify the temperature profile to insure that the temperatures of the top and bottom surfaces of the glass are sufficient to insure an adequate temper when the glass is quenched by cooling with cool tempering medium in the first quench zone 22. In the first furnace in which the system was installed according to the present invention, a desired target temperature for both surfaces is 1230° F. (about 665° C.) for glass sheets 7/32 inch (5.6 millimeters) thick to 3/16 inch (4.8 millimeters) thick and 1240° F. (about 670° C.) for glass sheets 5/32 inch (4 millimeters) to ⅛ inch (3.2 millimeters) thick.

The basic elements for measurement of glass temperature are infrared radiation pyrometers. Pyrometers used in this system are Ircon Model 7000. This unit was used because of its narrow spectral band pass (4.8 to 5.2 microns) at a wavelength which the glass is essentially opaque. It provides, for all practical purposes, a measurement at the glass surface, although some contribution to the temperature signal is obtained from as far as 0.040 inch (1 millimeter) below the surface. In addition, this spectral band pass provides a minimal effect on radiation absorption as the result of $CO$, $CO_2$, and $H_2O$ vapor in the furnace atmosphere. The pyrometers have a 0-10 volts DC output which is linear over the range of 500° to 1500° F. (and has a response time of 0.1 second). The pyrometer housings are of cast aluminum and are equipped with water cooling and air purge options to prevent damage as the result of adverse environmental conditions.

The top surface pyrometer 34 and bottom surface pyrometer 36 are operated in a wave band 4.8 to 5.2 microns, preferably. In this wave band, the portion of the spectral band where effects of absorption by carbon monoxide, water and carbon dioxide is at a minimum. Furthermore, the wave band is selected because soda-lime-silica glass of the float glass type is transparent to a depth of only about 0.040 inch (approximately 1 millimeter). Since the glass sheets presently processed on this line have thicknesses greater than 2 millimeters, the top surface pyrometer 34 is capable of measuring the top surface temperature without any significant effects from the bottom surface temperature and the bottom surface pyrometer 36 is capable of measuring the bottom surface temperature of the glass sheets without any substantial effects from the top surface temperature.

It is understood that the various components described in the illustrative embodiment are readily obtained commercially. For example, the unidirectional actuated switches 51 to 55 are sold as Microswitch catalog 11 LS-1 and switch 51 is oriented to be actuated only by right to left movement of cam 48 as seen in the drawings and switches 52 to 55 are oriented to be actuated only by left to right movement. The circuits described herein comprise modules available commercially from Bell & Howell for performing the various functions enumerated, and since their manner of operation is well known to those skilled in the electrical art, the details thereof are omitted as they would only increase the length of the present disclosure and obscure the gist of the present invention.

The embodiments of the invention just described are for illustration purposes. It is understood that various changes may be made without departing from the gist of the invention as defined in the claimed subject matter that follows.

We claim:

1. A method of monitoring the temperatures of a series of glass sheets conveyed in a substantially horizontal path of travel through an elongated tunnel-type furnace enclosure formed by refractory walls wherein each of the glass sheets are oriented to provide a top major surface and a bottom major surface, comprising the steps of moving a pyrometer above the furnace into alignment with a first small, discrete opening in the top refractory wall of the furnace, opening normally closed closure means for said first opening, measuring the temperature of a portion of a top major surface of a sheet of glass passing beneath said first opening within the furnace by means of said pyrometer, closing said closure means for said first opening, conveying said pyrometer in a direction substantially horizontal and transverse to the path of the glass sheets, stopping the pyrometer in alignment with a second small, discrete opening in the top refractory wall of the furnace, opening a normally closed closure means for said second opening, measuring the temperature of a portion of a top major surface of a glass sheet passing beneath said second opening within the furnace, closing said closure means for said second opening, and repeating said steps periodically so as to maintain a measurement of the temperature profile across the top surface of the series of glass sheets conveyed through the furnace.

2. The method according to claim 1, wherein said glass surface temperature measurements are made with a radiation pyrometer using a wave band of 4.8 to 5.2 microns, in which wave band the glass sheets are transparent for a maximum thickness of 1 millimeter.

3. A method as in claim 1, further including moving said sheets through a cooling station having at least two quench zones immediately after said glass sheet leaves said furnace, cooling said glass sheet in said first quench zone to a temperature at which there remains insufficient residual internal heat within said glass sheet to reduce the temper thereof by reannealing said sheets under prevailing cooling conditions established at the cooling station, and measuring the temperature at a preselected portion of a surface of each said glass sheet as said portion leaves said first quench zone.

4. The method of claim 1, wherein the temperatures of bottom surface portions of selected glass sheets of said series are measured with a second pyrometer.

5. The method as in claim 4, wherein said glass sheets are heated while their lower major surfaces are supported on a hot gaseous bed and their upper major surfaces are irradiated by radiant heaters, wherein the power supplied to said radiant heaters are the temperature of said gaseous bed are adjusted in response to the temperatures monitored at said upper and lower surfaces.

6. The method as in claim 1, wherein each of said top surface temperatures is measured by aiming the pyrometer through a sight tube extending through each of said openings, covering the top end of each sight tube for a major portion of a temperature monitoring cycle and opening said top end for sufficient time to make a temperature measurement therethrough.

7. The method as in claim 6, wherein said top end is opened prior to each temperature measurement therethrough for sufficient time to purge any gas that may have been cooled therein since the previous temperature measurement therethrough.

8. Apparatus for heating a series of glass sheets and monitoring the temperature thereof comprising: a tunnel-type furnace enclosure formed by refractory walls, means for conveying glass sheets along a longtidinal path through the furnace with the glass sheets supported in a generally horizontal orientation, a plurality of small, discrete openings through the top refractory wall of the furnace spaced from each other in a direction generally transverse to the path of glass conveyance, a pyrometer mounted above the furnace, means for transversely moving the pyrometer into vertical alignment with each of said openings in sequence so that a temperature measurement of a sheet of glass may be made through each opening, closure means associated with each of said openings for covering each respective opening, and control means responsive to the location of the pyrometer for opening the respective closure when the pyrometer is aligned with each of the openings.

9. The apparatus of claim 8 wherein said openings are sight tubes extending through the top of the furnace, and said closure means include a pivotable cover overlying the upper end of each sight tube.

10. The apparatus of claim 8 further including a second pyrometer mounted below the furnace is fixed alignment with a narrow opening extending through the furnace to the underside of the path of glass conveyance.

11. Apparatus as in claim 10, further including a cooling station having at least two quench zones disposed beyond said furnace, said conveying means extending through said cooling station and said furnace, and a third pyrometer positioned in said cooling station in position to be focused on a surface of said glass sheets at the end of the first of said quench zones where each glass sheet should be cooled to a temperature at which there remains insufficient residual internal heat within said glass sheet to reduce the temper thereof by reannealing said sheets under prevailing cooling conditions established at the cooling station.

12. The apparatus of claim 8 wherein said furnace comprises a gas hearth bed.

* * * * *